Aug. 6, 1968 CHAO CHEN WANG 3,396,348

BROADBAND CONTROLLED MUTUAL INDUCTANCE SLOW WAVE PROPAGATING STRUCTURE

Filed Jan. 6, 1964 4 Sheets-Sheet 1

INVENTOR
CHAO CHEN WANG
BY
John H. Gallagher
ATTORNEY

INVENTOR
CHAO CHEN WANG
BY
John H. Gallagher
ATTORNEY

INVENTOR
CHAO CHEN WANG
BY
John H. Gallagher
ATTORNEY

INVENTOR.
CHAO CHEN WANG
BY
John H. Gallagher
ATTORNEY

United States Patent Office 3,396,348

Patented Aug. 6, 1968

3,396,348

BROADBAND CONTROLLED MUTUAL INDUCTANCE SLOW WAVE PROPAGATING STRUCTURE

Chao Chen Wang, Mineola, N.Y., assignor to Sperry Rand Corporation, Great Neck, N.Y., a corporation of Delaware Filed Jan. 6, 1964, Ser. No. 335,912
7 Claims. (Cl. 333—31)

ABSTRACT OF THE DISCLOSURE

A ladder line slow wave propagating structure having two interlaced sets of conductive loops connecting the individual ladder rungs together. One set is angularly disposed relative to the other set to reduce mutual coupling inductances thereby achieving broadband operation. The physical sizes and positions of the two sets of conductive loops are adjusted so that the adjacent conductive loops have substantially equal inductive susceptances.

This invention relates to broadband slow wave propagating circuits and more particularly to such circuits that have a high interaction impedance and are suitable for use in crossed-field electron beam amplifying tubes.

Crossed-field electronic tubes are characterized by employing orthogonal D.C. electric and magnetic fields, both of which are orthogonal to the stream of electrons. The efficiencies of crossed-field devices are high for electronic tubes, and for this reason considerable attention has been given to their development. A detailed discussion of crossed-field electronic tubes is contained in the two-volume text, Crossed-Field Microwave Devices, by E. Okress, et al., published in 1961 by Academic Press, Inc., New York, N.Y. In order for these devices to be truly practical and versatile for widespread commercial applications they must possess high interaction impedance in order to achieve high gain, must operate satisfactorily over a wide frequency range, and must be able to be made in small enough physical size to be useful in environments where size and weight are of major importance. Known prior crossed-field microwave devices have not possessed all of these advantageous features in one device. Known devices having high interaction impedance are characterized by a narrow operating frequency range, and vice versa.

It therefore is an object of this invention to provide a slow wave propagating structure for a microwave device wherein the propagating structure exhibits a high interaction impedance over a relatively wide frequency range.

Another object of this invention is to provide a high gain, wide bandwidth slow wave propagating structure for a crossed-field electronic tube amplifier that is relatively small in size.

A further object of the invention is to provide a broadband, high interaction impedance slow wave propagating structure that is easily coolable.

In accordance with the present invention, a ladder line type of slow wave propagating structure, or circuit, is made to be less dispersive and thus the forward propagating component of waves on the circuit substantially synchronous with the electron stream velocity over a wider band of frequencies by controlling the relative magnitudes of the respective self inductances of the successive iterative circuits that form the slow wave structure. This is accomplished by splitting into two different current paths those portions of the elementary ladder line that carried maximum currents. The two current paths, which take the form of conductive loops, then are angularly disposed with respect to each other to reduce the mutual coupling inductances between the iterative circuits of the structure. With these conditions existing, the changes with frequency of mutual coupling inductances and mutual coupling capacitances no longer cancel, as they do in the elementary ladder structure or circuit, so that the average transverse phase velocity of waves on the circuit now vary as a function of frequency, thus permitting substantial synchronization over a broader band of frequency with the waves of the electron beam of the tube. To minimize the amplitude of the backward wave component of the waves on the structure, the physical size and position of the loops should be arranged so that the adjacent loops have substantially equal inductive susceptances.

The invention will be described by referring to the accompanying drawings wherein.

Figures 1, 2:
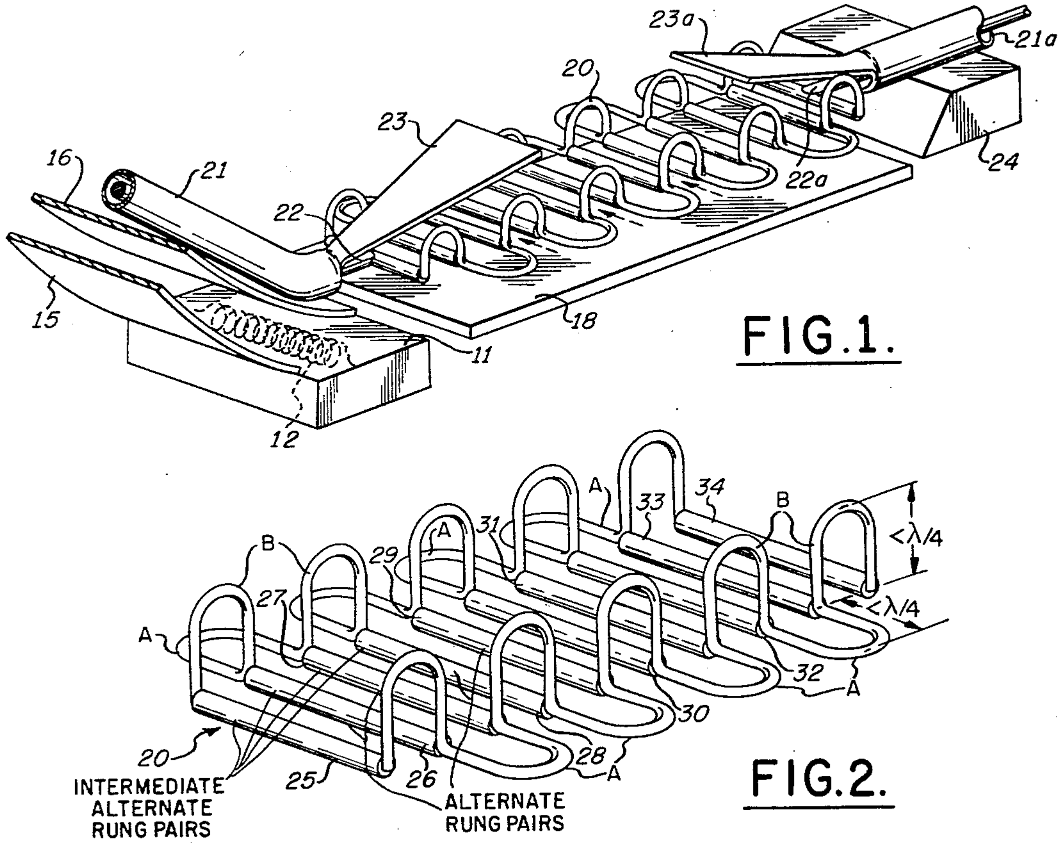
FIG. 1 is a simplified illustration of a crossed-field amplifying device in which the slow wave structure of the present invention may be employed.
FIG. 2 is a perspective view of an embodiment of the present invention.

Referring now in more detail to the drawings, FIG. 1 is a simplified illustration of an emitting-sole linear magnetron amplifier in which the slow wave propagating structure of the present invention may be employed. The linear magnetron amplifier is comprised of an electron emissive surface 11 which when heated by cathode heater 12 supplies electrons that are directed longitudinally to the right by means of focusing electrodes 15 and 16. A secondary electron emissive surface 18 extends longitudinally to the right and is bombarded by the primary electrons from emissive surface 11 to help supply the space charge cloud of electrons that is characteristic of the emitting-sole type of crossed-field device. A D.C. magnetic field extends parallel to the secondary electron emitting surface 18 and transversely to the flow of electrons along the tube, as illustrated in the conventional manner by the several arrows.

Disposed above secondary electron emissive surface 18 and biased at a positive D.C. potential with respect thereto is the R.F. slow wave propagating sturcture 20 along which the electromagnetic waves propagate and interact with the stream of electrons. Electromagnetic waves to be amplified may be coupled onto and off of slow wave propagating structure 20 by any of a number of different ways. One such way that is illustrated in FIG. 1 wherein input waves are coupled onto structure 20 by means of a coaxial transmission line 21 whose inner conductor 22 is directly connected to the first conductive rung of the slow wave structure 20. Preferably, inner conductor 22 will flare outwardly in width to achieve an electrically smooth coupling. For the same purpose, a conductive flap 23 extends longitudinally from the outer conductor of coaxial line 21 and tapers upwardly away from the slow wave structure 20. The output coupler is substantially identical and is identified by corresponding numerals with the subscript *a*. A collector electrode 24 is disposed at the end of the tube and terminates the stream of electrons. Reference is hereby made to the above-identified text by Okress et al. for a detailed explanation of the amplification phenomena that takes place in this type of crossed-field device.

One embodiment of the R.F. slow wave propagating structure 20 of this invention is illustrated in more detail in FIG. 2. The structure basically is similar to the ladder line type of slow wave propagating structure that is comprised of the spaced transversely-extending parallel conductive rods or rungs 25–34 that are disposed along the interaction region of the tube. In this structure, conductive rods 25–34 have a transverse length somewhat less than one-quarter wavelength at the center frequency of the band of frequencies that may propagate on the structure. The longitudinal spacing of conductive rods 25 is determined in accordance with the desired synchronous phase velocity of the waves. Connected between the ends of successive transverse rungs of the ladder line are two groups of conductive U-shaped loops A and B. Loops A extend horizontally in the plane of conductive rungs 25–34 between pairs of alternate pairs of the conductive rungs, and loops B extend vertically from the conductive rungs of intermediate alternate pairs of rungs. It may be seen that the second rung 26 of an alternate pair of rungs 25 and 26, for example, is the first rung of the adjacent intermediate alternate pair of rungs comprised of rungs 26 and 27. The conductive loops A and B function to broadband the propagating characteristics of the slow wave structure in a manner to be explained hereinbelow.

As is known, the conventional ladder line is a narrow band device, but does have the desirable characteristic of high interaction impedance $Z_t$, wherein $$Z_t = E^2/2\beta^2 P$$

E being the R.F. electric field strength in the interaction region, $\beta$ being the synchronous phase constant of the circuit, and P the R.F. power flowing along the line. Attempts have been made to increase the bandwidth of the ladder line by increasing or decreasing the mutual coupling capacitances between transversely-extending rods, or rungs, of the ladder. This does have the effect of broadbanding the circuit since the changes with frequency of mutual coupling inductances and capacitances no longer cancel as they do in the elementary ladder line. These schemes of broadbanding, however, also have the deleterious effect of reducing the percentage of the total stored electric energy that is available in the interaction region of the device. This lowers the value of the interaction impedance $Z_t$ of the device since the ratio $E^2/P$ has been reduced, thus reducing the gain of the device.

Figure 3:
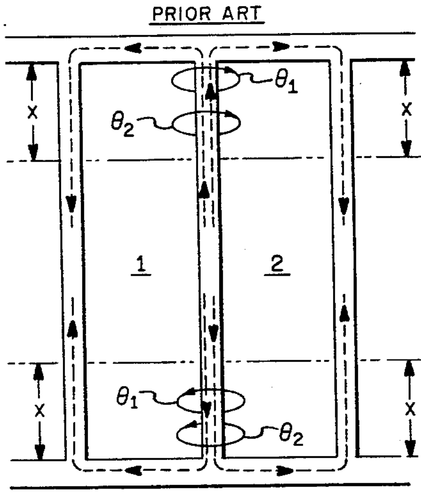
FIGS. 3 and 4 are views of segments of the prior art ladder line and the line of the present invention, respectively, and are used to aid in the explanation of the operation of the line of this invention.

The concept underlying the present invention is not to disturb the mutual coupling capacitances of the ladder line, but instead, to reduce the mutual coupling inductances of the structure. This destroys the natural tendency of the mutual coupling capacitances and inductances to cancel, thereby broadbanding the propagating characteristics of the structure without seriously affecting the transverse impedance of the structure. The way in which this is accomplished may be explained in the following manner. In each current loop of the ladder line, the current is maximum in the regions at the ends of the transverse rods or rungs. This also means that the mutual coupling inductance has its greatest effect in these regions. This condition is illustrated in FIG. 3 where the regions X at the ends of the conductors indicate the regions where mutual coupling inductances are of maximum effect. The current loops are illustrated in FIG. 3 by the dashed lines, without regard to the relative phases of the currents in adjacent loops 1 and 2.

Figure 4:
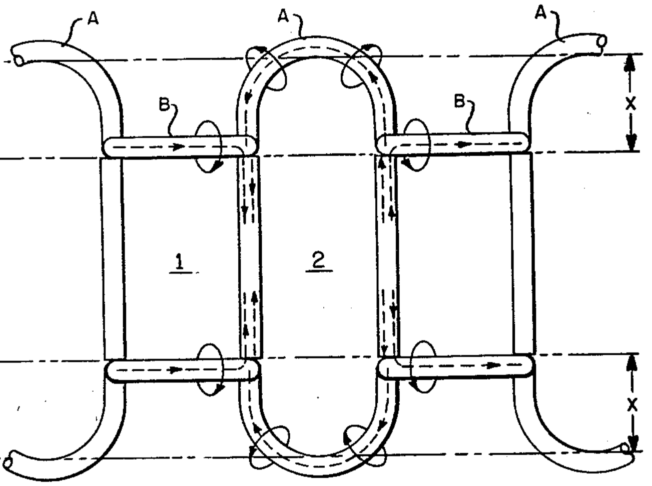

In the present invention, the mutual coupling inductance is reduced by splitting, or dividing, the conductors in the regions X into separate conductors for the current loops 1 and 2 and physically separating the conductors at an angle with respect to each other, thereby to reduce the magnetic coupling between the loops and thus reduce the mutual coupling inductances along the structure, thereby broadbanding the operation of the structure. This feature is illustrated in detail in FIG. 4, where in the regions X the rungs of the ladder line have been split into the conductive loops A and B to provide separate current paths. As illustrated, these loops A and B are angularly disposed with respect to each other to reduce the magnetic coupling between adjacent loops. This then reduces the mutual coupling inductance between current loops, and achieves the desired objective of the invention. In the mode of operation suitable for crossed-field devices, the electric field is relatively strong and the effect due to mutual capacitance is highest in the central portion of the ladder rungs where the interaction between the electron beam and the R.F. waves occur. It is evident that the mutual coupling capacitances between the central portions of the rungs of the ladder line have not been disturbed in the structure of this invention.

An alternative way of considering the function performed by the conductive loops A and B is to consider them as short lengths of transmission line that present inductive susceptances along the length of the ladder line. As inferred by this consideration, the transverse lengths of the conductive loops A and B from the ends of the rungs is less than a quarter wavelength for waves of the shortest wavelength that propagate on the slow wave structure.

The slow wave structure of this invention is intended to be operated in a crossed-field device in which the phase velocity of the fundamental component of the R.F. waves is substantially synchronous with the beam velocity.

Figure 5:
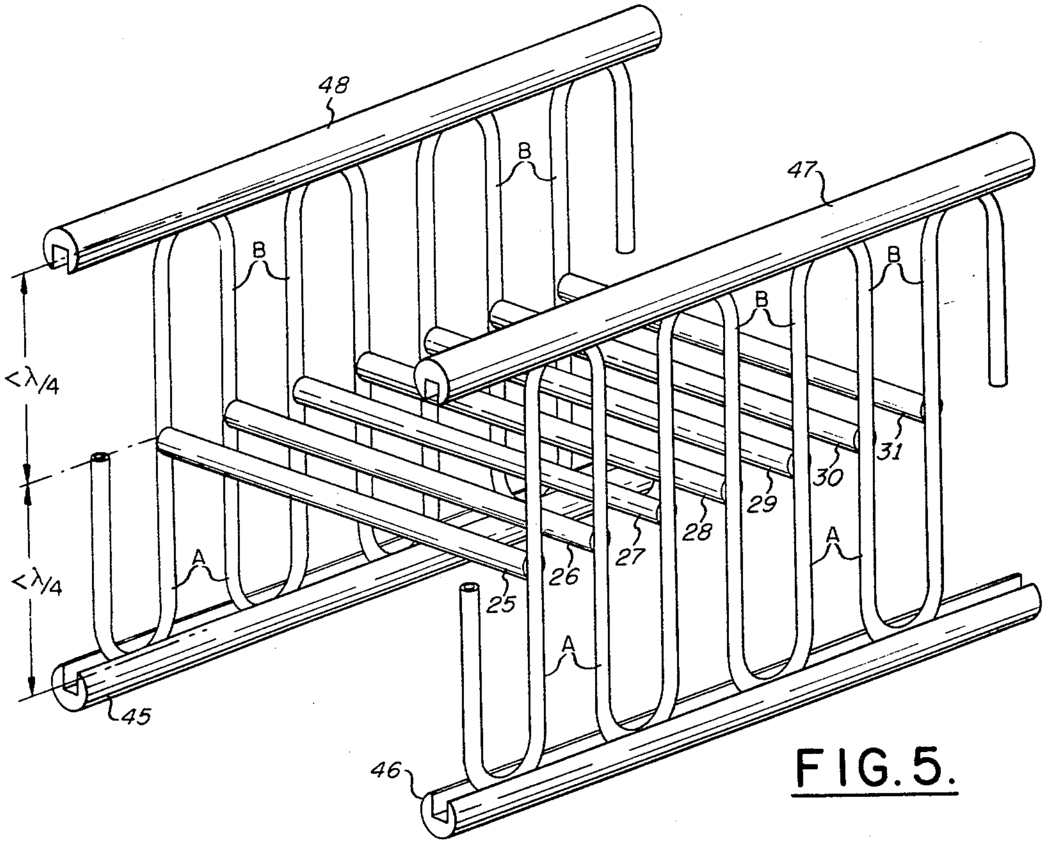
FIGS. 5, 6 and 7 are illustrations of other embodiments of the slow wave structure of the present invention.

The mutual inductance between adjacent loops of the structure can be further decreased by increasing beyond 90° the angular displacement of the A and B loops. This may be accomplished by inclining toward each other the respective groups of vertical B loops on opposite ends of the rungs, or by inclining the A loops downwardly from the horizontal plane of the rungs of the ladder. However, the rate of change of mutual inductance as a function of the angular displacement between the A and B loops decreases when the angular displacement exceeds 90°. One such embodiment of the alternatives just mentioned is illustrated in FIG. 5 where the A and B loops are angularly disposed at 180° with respect to each other. This embodiment offers the advantage of simpler construction because the serpentine structures forming the loops on each side of the rungs of the ladder are relatively easy to construct.

One possible disadvantage of inclining the loops below the horizontal plane of the rungs of the ladder is that they will be physically closer to the emitting sole of the tube. This could result in excessive leakage current between the sole and circuit and would be deleterious to the operation of the tube. Should this present a problem, the planes in which the two serpentine structures lie could be inclined away from each other on the side of the rungs nearest the sole so as to provide greater spacing between the sole and circuit.

Also illustrated in FIG. 5 is one suitable means for supporting the slow wave structure of this invention within an electronic tube. The supporting means comprises the four cylindrical rods 45, 46, 47, and 48 which are grooved along their respective lengths to receive the outermost ends of the conductive loops A and B. Supporting arrangements of a similar type may be employed with the slow wave structures illustrated in FIG. 2, although it may not be possible in all instances to employ four ceramic rods. For example, a satisfactory support has been obtained for the structure of FIG. 2 by employing only two ceramic rods that engage the vertically extending conductive loops B.

One concern of major importance in the crossed field devices is heat dissipation from the slow wave structure. The slow wave structure of the present invention may be readily cooled by forming all or portions of the structure from hollow tubing so that a fluid coolant may be passed therethrough. This is illustrated in FIG. 5 wherein the serpentine structures that form the conductive loops A and B on the two ends of the transverse rods 25–31 are formed of a continuous hollow tubing through which a fluid coolant may be passed.

Figure 6:
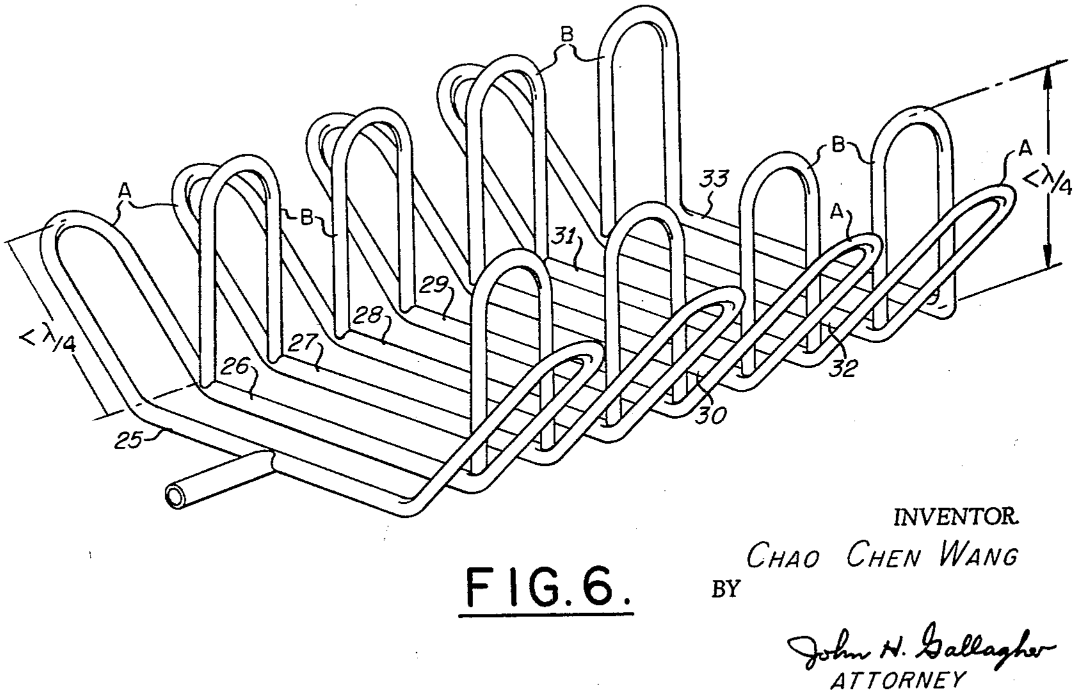

Another embodiment of the slow wave structure of this invention is illustrated in FIG. 6. This embodiment is similar to the embodiment of FIGS. 2 and 4 except that the conductive loops A are angularly displaced from the conductive loops B at an angle less than 90°.

Figure 7:
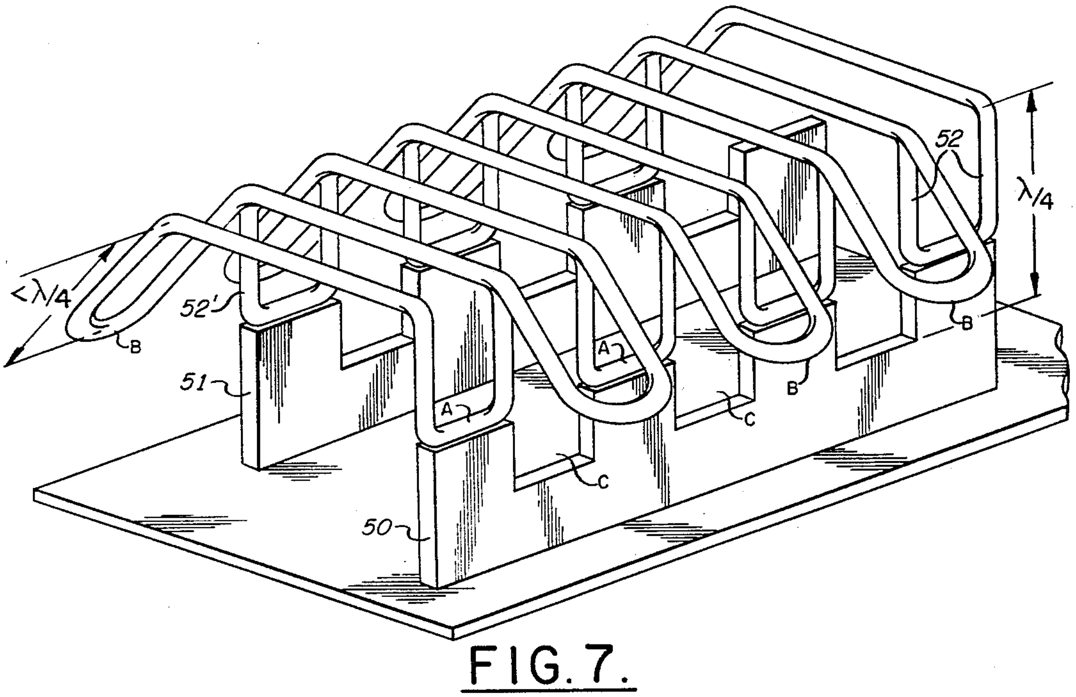

A further embodiment of the invention is illustrated in FIG. 7. In this embodiment of the invention the transverse conductive rods 25–30 are supported on the teeth of notched plates 50 and 51 by means of vertical rods 52 and 52' that extend along the respective notched plates 50 and 51. In this embodiment the conductive loops A are formed by the vertical rods 52 and the top edge of the teeth to which they are secured. The conductive loops B are similar to those illustrated in FIG. 2.

The loops C formed by the deep notches of conductive plates 50 and 51 can be made to have substantially no effect on the operation of the circuit over a given frequency range by making the vertical distance from the ends of the transverse conductive rods to the bottom of the deep notches substantially equal to a quarter wavelength. The quarter wavelength loops C therefore present a high impedance to the ends of the conductive rods and substantially no current will flow through the loops C. In this embodiment of the invention, the conductive rods and the loops B may be made of continuous hollow tubing to permit the passage of a fluid coolant therethrough.

The embodiment of the invention of FIG. 7 illustrates a slight variation in the arrangement of the conductive loops A and B at the ends of the transverse rods 25–30 of the ladder circuit. As may be seen, the conductive loops A are staggered with respect to each other along opposite sides of the conductive rods 25–30, as are the conductive loops B. That is, a loop A opposes a loop B at respective ends of a given pair of rungs. This establishes a type of gliding symmetry between the two ends of the conductive rungs 25–30. It may be seen that this differs from the arrangements previously illustrated because in all of those previously illustrated arrangements the conductive loops A were directly opposite each other between a pair of conductive rungs, as were the conductive loops B. The slow wave structure of FIGS. 2, 5 and 6 also may be fashioned with the gliding symmetry rather than the regular symmetry, if so desired.

Figure 8:
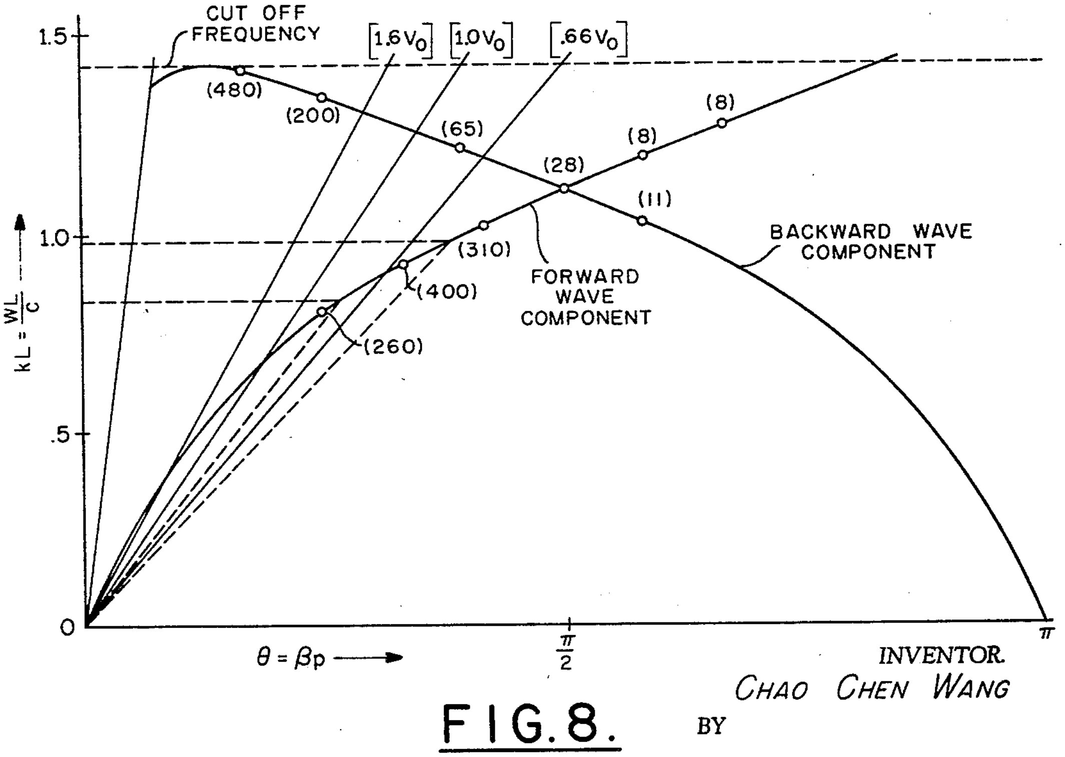
FIG. 8 is a graph illustrating various operating characteristics of a slow wave propagating structure constructed in accordance with this invention.

In order to offer a better insight into the design of the circuits of the present invention, the following brief theoretical development is presented. Each of the circuits illustrated in FIGS. 2, 5, 6 and 7 generally may be classified as a biperiodic structure because the geometry of the structure is repeated every second rung or period $p$ of the ladder structure, wherein period $p$ is the distance between adjacent rungs of the ladder structure. To satisfy the general conditions for wave propagation through such a structure, two sets of waves are usually needed, one with $\theta$ phase shift per period of the structure, and the other with $(\theta+\pi)$ phase shift per period. If the $\theta$ component is a forward propagating wave component, the $(\theta+\pi)$ component is a backward propagating wave component. In order for the slow wave propagating structure to serve in a forward wave amplifier, it is desirable that the magnitude of the backward wave component be kept as low as possible. A typical dispersion curve ($\omega$–$\beta$ diagram) for a circuit of the type illustrated in FIG. 6, wherein the A and B loops are in respective planes at 45° with respect to each other, is illustrated in FIG. 8. On this graph, values along the abscissa and ordinate axes are normalized values, and the numbers in brackets at the top of the graph of FIG. 8 represent normalized beam voltage $V_0$. The numbers in parentheses located adjacent the curves represent typical interaction impedances of the space harmonic components. To avoid appreciable coupling between the undesired backward wave component and the electron beam over a wide frequency range, it is necessary that the interaction impedance of the backward wave component be low throughout substantially the entire frequency range. It will be shown below that by properly controlling the relative inductances of the loops A and B the interaction impedance of the backward wave component can be greatly reduced without substantially reducing the high interaction impedance of the forward wave component. It may be seen in FIG. 8, however, that the interaction impedance of the forward wave component is high in the lower frequency portion of the curve and low in the higher frequency portion. Just the opposite situation prevails with respect to the backward wave component. In the following analysis it will be shown that the desired result of reducing the interaction impedance of the backward wave component may be achieved if the equivalent inductive susceptances $Y_a$ and $Y_b$ presented by the A and B loops of the structure of FIG. 5 are substantially equal. It does not necessarily follow that equal size loops A and B will produce equal inductive susceptances, this resulting from the fact that the loops are oriented differently with respect to the ladder circuit. Successive trials and measurements may be necessary before the inductive susceptances of the A and B loops can be made substantially equal.

The present development generally follows the method of calculating the properties of slow wave structures that is set forth by J. C. Walling in an article entitled "Interdigital and Other Slow Wave Structures," appearing on pages 239–258 of the September 1957 issue of Journal of Electronics and Control, published by Taylor and Francis Ltd., London, England. For purposes of this development, the circuit under investigation may be represented by the simplified sketches of FIGS. 9*a* and 9*b*. In this development it is assumed that the electromagnetic field distribution on the structure can be represented by a TEM wave, or a sum of such waves, propagating between adjacent rungs in the direction parallel to the individual rungs of the elementary ladder line. The general approach of this development is to obtain expressions for the waves in the region I of the structure, see FIG. 9*a*, and then the appropriate boundary conditions are inserted into these expressions to represent a matched condition at the common boundary X—X between regions I and II. These expressions then may be solved to give the dispersion characteristics of the circuit. To simplify the mathematics, it will be assumed that the mutual inductance between adjacent loops is negligibly small. Its effect, if there is any, can be lumped into the equivalent inductances that we will assume for these loops.

Figure 9A:
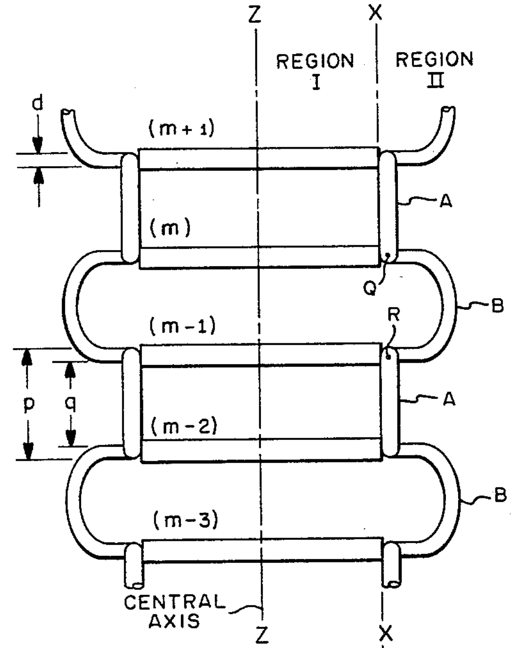
FIGS. 9A and 9B are simplified sketches in two views of a circuit of this invention and is used in deriving mathematical expressions relating to its operating characteristics.
Figure 9B:
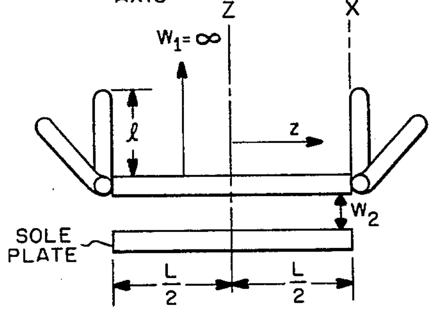

Proceeding now with the development, we may assume that in region I of FIG. 9*a* the voltage $V_m$ and current $I_m$ may be expressed as follows:

$$V_m=[A_1e^{-jm\theta}+A_2e^{-jm(\theta+\pi)}]\cos kz$$

$$I_m=[A_1Y(\theta)e^{-jm\theta}+A_2Y(\theta+\pi)e^{-jm(\theta+\pi)}]\sin kz$$

wherein $A_1$ and $A_2$ represent, respectively, the magnitudes of the forward and backward wave components on the circuit, $e$ is the base of natural logarithms (2.718), $m$ is the $m$th conductive rung of the ladder line, $k=\omega/c$, $\omega$ being the angular frequency of the waves and $c$ being the velocity of light in free space, $z$ is a distance along a conductive rung measured from the central axis Z—Z of the structure, $\theta$ is the phase constant per period ($\theta$ of this development corresponds to the $\phi$ used in the Walling article), and $Y(\theta)$ and $Y(\theta+\pi)$ are defined by the admittance expression given in Equations 1 and 2 of the Walling article, these expressions being reproduced as follows:

$$Y(\theta)=\sqrt{\frac{\epsilon}{\mu}}\left[\frac{4d}{q}\sin^2\left(\frac{\theta}{2}\right)+2(1-\alpha)\sin\left(\frac{\theta}{2}\right)\{S_1(W_1,\alpha)+S_1(W_2,\alpha)\}\right] \quad (1)$$

where $\alpha=q/p$ and $q$, $p$, and $d$ are the dimensions illustrated in FIG. 9*a* and $\epsilon$ and $\mu$ are the permittivity and permeability of the propagating medium. $S_1(W\alpha)$ is defined as being equal to $$\sum_{-\infty}^{+\infty}(-1)^m \cot\left\{\frac{W}{p}(\theta+2m\pi)\right\}\frac{\sin\{(1-\alpha)(\theta/2+m\pi)\}\sin\alpha\left(\frac{\theta}{2}+m\pi\right)}{(1-\alpha)(\theta/2+m\pi)\alpha\left(\frac{\theta}{2}+m\pi\right)} \quad (2)$$

Values of $S_1(W\alpha)$ are tabulated by Walling for a wide range of parameters.

It may be assumed that the side loops A and B have the respective input admittances $Y_a$ and $Y_b$. If the loops A and B are considered as short circuited two wire transmission lines, then their admittances may be represented as $$-j(1/Z_0)\cot kl$$

where $Z_0$ is the characteristic impedance of the two wire line and $l$ is the length of line.

The summation of the currents at the junction Q on conductor in (FIG. 9*a*) gives the following expression:

$$(a+jb)A_1+(c+jd)A_2=0 \quad (3)$$

where $$a=Y(\theta)\tan\left(\frac{kL}{2}\right)+2(Y_a+Y_b)\sin^2\theta/2 \quad (3a)$$

$$b=-d=\sin\theta\,(Y_a-Y_b) \quad (3b)$$

$$c=Y(\theta+\pi)\tan k\frac{L}{2}+2(Y_a+Y_b)\cos^2\theta/2 \quad (3c)$$

The summation of the currents at the junction R on conductor $(m-1)$ gives the following expression:

$$(a-jb)A_1-(c-jd)A_2=0 \quad (4)$$

The determinant from Equations 3 and 4 must be equated to zero to solve for the propagation characteristic of $k$ vs. $\theta$. In the solution of the determinant, the imaginary part drops out and the real part becomes:

$$ac-b^2=0 \quad (5)$$

When $Y_a=Y_b$, $b=-d=0$, i.e., the loops A and B are made to have exactly the same admittance, then the $k$ vs. $\theta$ curve will have a period of $2\pi$ in $\theta$ rather than $\pi$ in $\theta$ as it is in a biperiodic circuit since the conditions at the junction points Q and R on the structure of FIG. 9*a* will be the same. The information necessary to plot a dispersion curve of $k$ vs. $\theta$ (a $\omega$–$\beta$ diagram) may be obtained by separately equating the term $a$ of Equation 3*a* and the term $c$ of Equation 3*c* to zero. The curves for $a=0$ and $c=0$ when $Y_a=Y_b$ are plotted in FIG. 10. The $a=0$ curve represents the forward propagating wave component. The $c=0$ curve, plotted in the dash-dot line, is really the solution of a backward wave component displaced along the $\theta$ axis by $\pi$.

Figure 10:
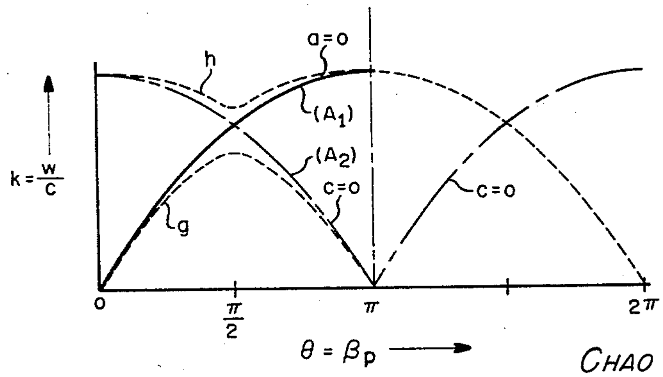
FIG. 10 is a graph showing several curves that are used in the discussion of the design of the circuits of this invention.

Next it is assumed that $Y_a$ and $Y_b$ are not equal to each other, which means that $b$ of Equation 3*b* now has some finite value. The dissimilarity of $Y_a$ and $Y_b$ causes the forward propagating wave component $A_1$ and the backward propagating wave component $A_2$ to couple together. The result of this coupling is represented in FIG. 10 by the combining of the $a=0$ and $c=0$ curves to form the dashed-line curves $g$ and $h$. It will be noted that the curves $g$ and $h$ are vertically displaced with respect to each other, indicating that a stop band exists in the propagation characteristics of the structure when $Y_a$ and $Y_b$ are unequal. Investigating Equations 3 through 5 will give an indication of how the dashed-line curves $g$ and $h$ will vary as the values $Y_a$ and $Y_b$ vary.

For the desired operation of the circuits of this invention in a forward wave amplifier the magnitude of the forward wave component $A_1$ should be large and the magnitude of the backward wave component $A_2$ should be as small as possible. To see how the parameters of the slow wave structure affect these desired conditions we may proceed as follows: We may rewrite Equation 3 in the following manner to obtain an expression for the ratio of the magnitudes of the forward and backward wave components:

$$\left|\frac{A_1}{A_2}\right|=\left|\frac{c+jd}{a+jb}\right| \quad (6)$$

Dividing Equation 5 by $c^2$ will give the relationships $$|\sqrt{a/c}|=|b/c| \quad (7)$$

$$|b|=|\sqrt{ac}| \quad (8)$$

From Equation 3*b* we know that $b=-d$. Therefore, substituting Equation 8 into Equation 6 gives the expression:

$$\left|\frac{A_1}{A_2}\right|=\left|\frac{\sqrt{c}}{\sqrt{a}}\left(\frac{\sqrt{c}-j\sqrt{a}}{\sqrt{c}+j\sqrt{c}}\right)\right| \quad (9)$$

Since we are considering magnitudes only, the numerator and denominator of the expression within brackets on the right side of Equation 9 represent vectors of equal magnitudes. Therefore the expression within brackets is equal to 1. Thus Equation 9 reduces to $$|A_1/A_2|=|\sqrt{c}/\sqrt{a}| \quad (10)$$

Now substituting the value of $\sqrt{a}$ obtained from Equation 8 into Equation 10 gives the result $$|A_1/A_2|=|c/b| \quad (11)$$

We now see from Equation 11 that forward to backward wave ratio $|A_1/A_2|$ depends upon the ratio $|c/b|$, and to maximize the ratio $|A_1/A_2|$, $b$ should be as small as possible. We see from Equation 3*b* that this may be accomplished by making $Y_a$ and $Y_b$ as nearly equal as possible. As stated before, this does not necessarily mean that the physical sizes of the A and B loops of FIGS. 2, 6, and 7 will be equal and it is very likely that they will not be equal. In the embodiment of FIG. 5, however, where the A and B loops are angularly displaced 180°, by virtue of symmetry, equal size loops may produce substantially equal values of $Y_a$ and $Y_b$ so that the backward wave component $A_2$ of FIG. 10 will be of very low amplitude.

As indicated from the graphs of FIGS. 8 and 10, the transverse width of a structure of this invention will be of the order of a quarter wavelength ($\pi/2$). This is one of the advantageous features of the circuits of this invention because many radar and communication systems have a multiplicity of components in their R.F. or microwave sections and these components must be packaged in a minimum of space. Since the known prior art crossed-field devices have widths in the order of one-half wavelength ($\pi$), the circuits of the present invention definitely would be an improvement for physical reasons alone. This is in addition to the superior electrical properties previously mentioned.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A slow wave propagating structure comprising, a succession of spaced parallel disposed conductive members, a first plurality of inductive susceptance means coupled to the transverse sides of alternate pairs of said members, a second plurality of inductive susceptance means coupled to the transverse sides of intermediate alternate pairs of said members, the second conductive member of a pair of members from said alternate pairs being the first conductive member of an adjacent pair of intermediate alternate pairs, the inductive susceptance means of adjacent pairs of said conductive members presenting inductive susceptances of substantially equal values.

2. A slow wave propagating structure comprising, a succession of spaced parallel disposed conductive rods, a first plurality of conductive loops extending respectively between the ends of the rods of alternate pairs of said conductive rods, a second plurality of conductive loops extending respectively between the ends of the rods of intermediate alternate pairs of said conductive rods, the second rod of a pair of rods from said alternate pairs being the first rod of an adjacent pair of rods of said intermediate alternate pairs, said first and second plurality of loops being disposed in respective first and second planes that are angularly disposed with respect to each other.

3. The combination claimed in claim 2 wherein said first and second pluralities of conductive loops present inductive susceptances of substantially equal magnitudes.

4. A ladder line slow wave propagating structure comprising, a succession of rung-like, spaced, parallel, straight conductive members disposed in a common plane, a first continuous serpentine-shaped conductive member symmetrically disposed along one side of said succession of conductive members and being in conductive contact with all of said members at successive positions intermediate the regions of change of direction of the serpentine-shape, and a second continuous serpentine-shaped conductive member disposed symmetrically along the other side of said succession of conductive members in a manner similar to that of said first serpentine-shaped member, said first and second serpentine-shaped members lying in respective planes that intersect said common plane of the succession of straight conductive members.

5. The combination claimed in claim 4 wherein said first and second serpentine-shaped members lie in respective planes that are transverse to said common plane of the succession of straight conductive members.

6. A slow wave propagating structure comprising, a succession of spaced parallel-disposed transversely extending, straight conductive members that comprise portions of a plurality of successively coupled electrical circuits, conductor means at each end of each one of said conductive members for providing a plurality of conductive paths at each end of each member, whereby current flowing in said parallel conductive members divides into said plurality of conductive paths at the end regions of said members, and inductive susceptance means associated with each of said plurality of conductive paths, said inductive susceptance means including current conductive loops extending between successive pairs of said parallel-disposed members, successive ones of said current conductive loops being angularly disposed with respect to each other, thereby providing reduced mutual coupling inductance effects between said successively coupled electrical circuits of said slow wave propagating structure.

7. A slow wave propagating structure comprising, a succession of spaced, parallel, straight conductive rods lying in a common plane, and a plurality of conductive loops disposed along the ends of said succession of conductive rods.

each of said loops extending between respective ends of pairs of said conductive rods, the second rod of one pair of rods comprising the first rod of the next successive pair of rods, whereby two of said loops terminate on each end of the rods, except for the first rod, alternate loops along each said side of said succession of conductive rods lying in a first common plane and intermediate alternate loops along each side of conductive rods lying in a second plane, said two planes being inclined at an angle with respect to each other.

References Cited

UNITED STATES PATENTS

| | | | |
|---|---|---|---|
| 3,230,485 | 1/1966 | Sabotka | 333—31 |
| 3,231,780 | 1/1966 | Feinstein | 333—31 |
| 2,920,227 | 1/1960 | Dohler et al. | 315—3.5 |
| 3,227,914 | 1/1966 | Birdsall | 315—3.5 |
| 3,273,081 | 9/1966 | Itzkan | 331—31 |

HERMAN KARL SAALBACH, *Primary Examiner.*

C. BARAFF, *Assistant Examiner.*